(12) United States Patent
Choi

(10) Patent No.: US 10,699,384 B2
(45) Date of Patent: Jun. 30, 2020

(54) IMAGE PROCESSING APPARATUS AND CONTROL METHOD THEREOF

(71) Applicant: SAMSUNG ELECTRONICS CO., LTD., Suwon-si (KR)

(72) Inventor: Hak-hun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 174 days.

(21) Appl. No.: 15/816,686

(22) Filed: Nov. 17, 2017

(65) Prior Publication Data

US 2018/0144448 A1 May 24, 2018

(30) Foreign Application Priority Data

Nov. 18, 2016 (KR) ........................ 10-2016-0154304

(51) Int. Cl.
*G06T 5/00* (2006.01)
*G06T 3/40* (2006.01)

(52) U.S. Cl.
CPC ............ *G06T 5/003* (2013.01); *G06T 3/4007* (2013.01); *G06T 3/4053* (2013.01); *G06T 2207/20201* (2013.01)

(58) Field of Classification Search
None
See application file for complete search history.

(56) References Cited

U.S. PATENT DOCUMENTS 8,682,089 B2  3/2014 Wedi
2006/0092280 A1* 5/2006 Kamijo ............... G06K 9/00785
                                          348/169

(Continued)

FOREIGN PATENT DOCUMENTS

KR      10-1274655 B1    6/2013
KR   10-2015-0040559 A   4/2015
(Continued)

OTHER PUBLICATIONS

International Search Report (PCT/ISA/210) dated Mar. 16, 2018, issued by the International Searching Authority in counterpart International Application No. PCT/KR2017/013107.
Written Opinion (PCT/ISA/237) dated Mar. 16, 2018, issued by the International Searching Authority in counterpart International Application No. PCT/KR2017/013107.
(Continued)

*Primary Examiner* — Kevin Ky
(74) *Attorney, Agent, or Firm* — Sughrue Mion, PLLC

(57) ABSTRACT

An image processing apparatus and a control method thereof are provided. The image processing apparatus includes: an image input interface configured to receive an image content including a first reference frame and a second reference frame; a memory; and a processor configured to generate an interpolation frame based on the first and second reference frames, and the processor is configured to group a plurality of pixels included in at least one of the first reference frame and the second reference frame into a plurality of pixel groups, and individually store each of the plurality of pixel groups in the memory, and load, into an internal memory, pixel values corresponding to a predetermined range with reference to a target pixel region of the interpolation frame with respect to a first pixel group from among the plurality of pixel groups, and load, into the internal memory, pixel values of a range which is smaller than the predetermined range with respect to a second pixel group of the plurality of pixel groups, and to determine pixel values of the target pixel region.

18 Claims, 14 Drawing Sheets

(56) References Cited

U.S. PATENT DOCUMENTS

| | | |
|---|---|---|
| 2008/0310508 A1 | 12/2008 | Huang et al. |
| 2010/0141783 A1* | 6/2010 | Sakaguchi ............ G06T 3/4053 |
| | | 348/222.1 |
| 2011/0299597 A1* | 12/2011 | Freiburg .............. H04N 19/132 |
| | | 375/240.16 |
| 2013/0170551 A1 | 7/2013 | Liu et al. |
| 2013/0176460 A1 | 7/2013 | Nakashima |
| 2014/0133780 A1 | 5/2014 | Liu et al. |
| 2014/0354556 A1 | 12/2014 | Alameh et al. |
| 2015/0084970 A1 | 3/2015 | Schaub et al. |
| 2016/0100129 A1 | 4/2016 | Im |
| 2016/0182812 A1 | 6/2016 | Mine |

FOREIGN PATENT DOCUMENTS

| | | |
|---|---|---|
| KR | 10-1603596 B1 | 3/2016 |
| KR | 10-2016-0040388 A | 4/2016 |

OTHER PUBLICATIONS

Communication dated Jun. 24, 2019, issued by the European Patent Office in counterpart European Application No. 17872095.9.

Gwo Giun Lee et al. "Bi-Directional Trajectory Tracking with Variable Block-Size Motion Estimation for Frame Rate Up-Convertor" IEEE Journal on Emerging and Selected Topics in Circuits and Systems, vol. 4, No. 1, Mar. 2014, (pp. 29-42).

* cited by examiner

IMAGE PROCESSING APPARATUS AND CONTROL METHOD THEREOF

CROSS-REFERENCE TO RELATED APPLICATIONS

This application claims priority from Korean Patent Application No. 10-2016-0154304, filed on Nov. 18, 2016 in the Korean Intellectual Property Office, the disclosure of which is incorporated herein by reference in its entirety.

BACKGROUND

Field

Apparatuses and methods consistent with exemplary embodiments relate to an image processing apparatus and a control method thereof, and more particularly, to an image processing apparatus which can adjust a resolution according to a motion of an image, and a control method thereof.

Description of the Related Art

In general, in the case of an image having a rapid change, a motion blur phenomenon such as a blurred image or generation of an afterimage may arise.

To address this problem, generally, an image processing apparatus may generate an interpolation image frame based on an amount of change in a motion between a previous image frame and a current image frame, and insert the generated interpolation image frame between the previous image frame and the current image frame.

By generating and outputting an interpolation image frame between a previous image frame and a current image frame, the problem of the motion blur phenomenon caused by a rapid change in an image may be reduced.

However, in order to generate such an interpolation image frame, a large amount of memory space is needed. In particular, regarding a region output with a high resolution from among the interpolation image frames, more memory space will be needed.

Therefore, there is a need for a method for generating an interpolation image frame while more effectively managing memory space.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an apparatus and a method for generating an interpolation image frame to be inserted between a previous image frame and a current image frame while effectively using a memory.

According to an aspect of an exemplary embodiment, there is provided an image processing apparatus including: an image input interface configured to receive an image content including a first reference frame and a second reference frame; a memory; and a processor configured to generate an interpolation frame based on the first reference frame and the second reference frame, wherein the processor is configured to: group a plurality of pixels included in at least one of the first reference frame and the second reference frame into a plurality of pixel groups, individually store each of the plurality of pixel groups in the memory, load, into an internal memory, pixel values corresponding to a predetermined range with reference to a target pixel region of the interpolation frame corresponding to a first pixel group from among the plurality of pixel groups, load, into the internal memory, pixel values of a range which is smaller than the predetermined range corresponding to a second pixel group from among the plurality of pixel groups, and determine pixel values of the target pixel region.

The processor may be further configured to divide at least one of the first reference frame and the second reference frame into a plurality of pixel blocks including a plurality of pixels, to group pixels of corresponding positions in each of the plurality of pixel blocks into the plurality of pixel groups, and to individually store each of the plurality of pixel groups in the memory.

The processor may be further configured to acquire at least one of a first pixel value corresponding to the first pixel group of at least one of the first reference frame and the second reference frame, and a second pixel value corresponding to the second pixel group based on a motion size of the target pixel region.

The processor may be further configured to, in response to the motion size of the target pixel region being less than a predetermined value and the second pixel value corresponding to the target pixel region being loaded into the internal memory, determine the pixel values of the target pixel region based on the first pixel value and the second pixel value, and to image-process the target pixel region with a resolution above a predetermined resolution.

The processor may be further configured to, in response to the motion size of the target pixel region being greater than or equal to a predetermined value and the second pixel value corresponding to the target pixel region not being loaded into the internal memory, determine the second pixel value of the target pixel region based on the first pixel value, and to image-process the target pixel region with a resolution lower than a predetermined resolution.

The processor may be further configured to, in response to the motion size of the target pixel region being greater than or equal to the predetermined value and the second pixel value corresponding to the target pixel region not being loaded into the internal memory, determine the second pixel value of the target pixel region based on the first pixel value of the corresponding pixel block and a first pixel value of at least one adjacent pixel block.

The processor may be further configured to, in response to the motion size of the target pixel region being greater than or equal to the predetermined value and the second pixel value corresponding to the target pixel region not being loaded into the internal memory, determine the second pixel value of the target pixel region based on the first pixel value of the corresponding pixel block.

The processor may be further configured to divide at least one of the first reference frame and the second reference frame into a plurality of pixel blocks including a plurality of pixels, to group pixel values of representative pixels in each of the plurality of pixel blocks, to group a difference value between each of the representative pixels and at least one other pixel, and to individually store the plurality of the difference value groups in the memory.

The processor may be further configured to, in response to a motion size of the target pixel region being less than a predetermined value and the difference value between the representative pixel corresponding to the target pixel region and at least one other pixel being loaded into the internal memory, determine a pixel value of the at least one other pixel based on the pixel value of the representative pixel and the difference value of the at least one other pixel, and to determine the pixel values of the target pixel region based on the pixel value of the representative pixel and the determined pixel value of the at least one other pixel, and to image-process the target pixel region with a resolution higher than a predetermined resolution.

According to an aspect of another exemplary embodiment, there is provided a control method of an image processing apparatus, the control method including: receiving an image content including a first reference frame and a second reference frame; and generating an interpolation frame based on the first reference frame and the second reference frame, wherein the generating the interpolation frame includes: grouping a plurality of pixels included in at least one of the first reference frame and the second reference frame into a plurality of pixel groups, storing the plurality of pixel groups in a memory, loading, into an internal memory, pixel values corresponding to a predetermined range with reference to a target pixel region of the interpolation frame with respect to a first pixel group from among the plurality of pixel groups, loading, into the internal memory, pixel values of a range which is smaller than the predetermined range with respect to a second pixel group of the plurality of pixel groups, determining pixel values of a target region of the interpolation frame based on at least one of the first pixel group and second pixel group loaded into the internal memory, and image-processing the interpolation frame based on the determined pixel values.

The storing may include dividing at least one of the first reference frame and the second reference frame into a plurality of pixel blocks including a plurality of pixels, grouping pixels of corresponding positions in each of the plurality of pixel blocks into the plurality of pixel groups, and individually storing each of the plurality of pixel groups in the memory.

The determining may include acquiring at least one of a first pixel value corresponding to the first pixel group of at least one of the first reference frame and the second reference frame, and a second pixel value corresponding to the second pixel group based on a motion size of the target pixel region, and determining pixel values of the target pixel region.

The image-processing may include in response to the motion size of the target pixel region being less than a predetermined value and the second pixel value corresponding to the target pixel region being loaded into the internal memory, determining the pixel values of the target pixel region based on the first pixel value and the second pixel value, and image-processing the target pixel region with a resolution higher than a predetermined resolution.

The image-processing may include in response to the motion size of the target pixel region being greater than or equal to a predetermined value and the second pixel value corresponding to the target pixel region not being loaded into the internal memory, determining the second pixel value of the target pixel region based on the first pixel value, and image-processing the target pixel region with a resolution lower than a predetermined resolution.

The determining the second pixel value of the target pixel region may include, in response to the motion size of the target pixel region being greater than or equal to the predetermined value and the second pixel value corresponding to the target pixel region not being loaded into the internal memory, determining the second pixel value of the target pixel region based on the first pixel value of a corresponding pixel block and a first pixel value of at least one adjacent pixel block.

The determining the second pixel value of the target pixel region may include, in response to the motion size of the target pixel region being greater than or equal to a predetermined value and the second pixel value corresponding to the target pixel region not being loaded into the internal memory, determining the second pixel value of the target pixel region based on the first pixel value of a corresponding pixel block.

The storing may include dividing at least one of the first reference frame and the second reference frame into a plurality of pixel blocks including a plurality of pixels; grouping pixel values of representative pixels in the plurality of pixel blocks; grouping a difference value between the representative pixel and at least one other pixel in each of the plurality of pixel blocks, and individually storing the plurality of difference value groups in the memory.

The determining may include in response to a motion size of the target pixel region being less than a predetermined value and the difference value between the representative pixel corresponding to the target pixel region and at least one other pixel being loaded into the internal memory, determining a pixel value of the at least one other pixel based on the pixel value of the representative pixel and the difference value corresponding to the at least one other pixel, and wherein the image-processing includes determining the pixel values of the target pixel region based on the pixel value of the representative pixel and the determined pixel value of the at least one other pixel, and image-processing the target pixel region with a resolution higher than a predetermined resolution.

The processor may be further configured to, in response to the motion size of the target pixel region being greater than or equal to a predetermined value and the second pixel value corresponding to the target pixel region not being loaded into the internal memory, set the second pixel value of the target pixel region to be equal to the first pixel value, and image-process the target pixel region with a resolution lower than a predetermined resolution.

The determining pixel values of the target region may include, in response to the motion size of the target pixel region being greater than or equal to a predetermined value and the second pixel value corresponding to the target pixel region not being loaded into the internal memory, setting the second pixel value of the target pixel region to be equal to the first pixel value, and image-processing the target pixel region with a resolution lower than a predetermined resolution.

BRIEF DESCRIPTION OF THE DRAWINGS

The above and/or other aspects will be more apparent and more readily appreciated from the following detailed description of the exemplary embodiments, taken in conjunction with the accompanying drawings, in which.

DETAILED DESCRIPTION OF THE EXEMPLARY EMBODIMENTS

Figure 1:
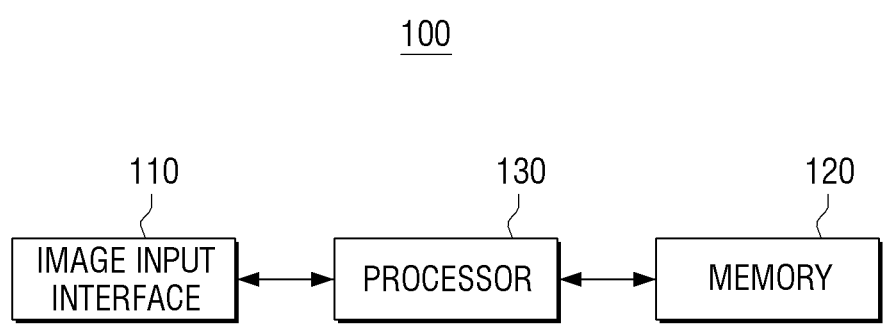
FIG. 1 is a block diagram of an image processing apparatus according to an exemplary embodiment.

Hereinafter, various example embodiments of the present disclosure will be described in greater detail with reference to the accompanying drawings. These example embodiments are described in sufficient detail to enable those skilled in the art to practice the inventive concept, and it is to be understood that the example embodiments are not intended to limit the present disclosure to particular modes of practice, and it is to be appreciated that all modification, equivalents, and alternatives that do not depart from the spirit and technical scope of the present disclosure are encompassed in the present disclosure.

In addition, like reference numerals or symbols shown in the drawings of the present disclosure indicate components or components that perform substantially the same function.

Throughout the disclosure, terms including ordinal numbers such as "first" and "second" may be used in the detailed description and the claims to distinguish elements from one another, but the elements should not be interpreted as limiting due to the use of the ordinal numbers. The ordinal numbers may be interchangeably used when necessary.

As used herein, the singular forms "a," "an" and "the" are intended to include the plural forms as well, unless the context clearly indicates otherwise. The terms "include," "have," or "is configured" indicate the presence of features, numbers, steps, operations, elements, and components described in the specification, or a combination thereof, and do not preclude the presence or addition of one or more other features, numbers, steps, operation, elements, or components, or a combination thereof. The term "and/or" includes any combination of a plurality of related listed items or any of the plurality of related listed items. The expression, "at least one of a, b, and c," should be understood as including only a, only b, only c, both a and b, both a and c, both b and c, or all of a, b, and c.

In addition, a "module" or "unit" used in exemplary embodiments performs one or more functions or operations, and may be implemented by using hardware or software or a combination of hardware and software. In addition, a plurality of "modules" or a plurality of "units" may be integrated into one or more modules, except for a "module" or "unit" which needs to be implemented by specific hardware, and may be implemented as one or more processors.

It will be understood that when an element is "connected with" another element, the element may be "directly connected with" another element, and the element may be "electrically connected with" another element with an intervening element therebetween.

FIG. 1 is a block diagram of an image processing apparatus according to an exemplary embodiment.

According to an exemplary embodiment, the image processing apparatus 100 may be, for example, a set-top box which receives a content from an external source and outputs the content to a display apparatus. However, embodiments are not limited thereto. The image processing apparatus 100 may be a display apparatus such as, for example, a smart phone or a smart television (TV) which internally image-processes a content received from an external source and outputs the content.

The image processing apparatus 100 may include an image input interface 110, a memory 120, and a processor 130. The image input interface 110 may receive an image content output wirelessly from an external content server or may receive a content stored in a storage medium physically connected with the image processing apparatus 100.

The memory 120 may store the image content input through the image input interface 110 on a frame basis. The memory 120 may be, for example, a double data rate (DDR) random access memory (RAM), but embodiments are not limited thereto. With respect to pre-stored image frames, the memory 120, which stores the image content on the frame basis, may group a plurality of pixels forming an image frame in each image frame according to a predetermined criterion, and may store the grouped pixels.

The processor 130 may generate an interpolation frame based on first and second reference frames from among the plurality of image frames forming the image content. Herein, the first reference frame may be a previous image frame and the second reference frame may be a current image frame. Accordingly, the processor 130 may generate an interpolation frame to be inserted between the first and second reference frames based on the first reference frame corresponding to the previous frame, and the second reference frame corresponding to the current image frame, from among the plurality of image frames forming the image content.

Such an interpolation frame may be used to reduce or prevent artifact phenomenon such as motion blur or the like, which is generated according to a change in a motion in an image, occurring when image frames corresponding to the first and second reference frames are output.

For example, the processor 130 may group a plurality of pixels forming at least one of the first and second reference frames according to a predetermined criterion, and may store the grouped pixels in the memory 120.

The processor 130 may divide at least one of the first and second reference frames into a plurality of pixel blocks including a plurality of pixels, and may group pixels at corresponding positions in each of the plurality of pixel blocks, and may individually store the grouped pixels in the memory 120.

In this case, the processor 130 may load, into an internal memory such as a read only memory (ROM), pixel values corresponding to a predetermined search range, with reference to a target pixel region of an interpolation frame to be inserted between the first and second reference frames, with respect to at least one first pixel group of the plurality of pixel groups pre-stored in the memory 120.

In addition, the processor 130 may load, into the internal memory, pixel values of a range which is smaller than the predetermined search range with respect to a second pixel group of the plurality of pixel groups pre-stored in the memory 120.

According to an exemplary embodiment, the processor 130 may load, into the internal memory, pixel values of a range corresponding to, for example, 50% of the predetermined search range, which is smaller than the predetermined search range, with respect to the second pixel group from the plurality of pixel groups pre-stored in the memory 120. However, exemplary embodiments are not limited thereto, and the processor 130 may load, into the internal memory, pixel values corresponding to a range set by a developer or a user with reference to the predetermined search range, with respect to the second pixel group.

Thereafter, the processor 130 may calculate pixel values on the target pixel region of the interpolation frame based on at least one of the first and second pixel groups loaded into the internal memory, and may perform image-processing with respect to the target pixel region based on the calculated pixel values.

Specifically, the processor 130 may acquire at least one of a first pixel value corresponding to the first pixel group of at least one of the first and second reference frames pre-stored in the internal memory, and a second pixel value corresponding to the second pixel group, based on a motion size of the target pixel region of the interpolation frame, and may calculate pixel values of the target pixel region based on at least one of the first pixel value and the second pixel value acquired.

According to an exemplary embodiment, in response to the motion size of the target pixel region being less than a predetermined value, and thus, the second pixel value corresponding to the target pixel region being loaded into the internal memory, the processor 130 may calculate pixel values of the target pixel region based on the first pixel value and the second pixel value corresponding to the target pixel region, and may process the target pixel region with higher resolution based on the calculated pixel values of the target pixel region.

For example, the processor 130 may calculate the motion size of the target pixel region of the interpolation frame based on a motion vector of each of the plurality of pixels forming the first and second reference frames. Accordingly, in response to the pre-calculated motion size of the target pixel region of the interpolation frame being less than a predetermined value, and thus, the second pixel value corresponding to the target pixel region being loaded into the internal memory, the processor 130 may calculate pixel values of the target pixel region based on the first pixel value and the second pixel value corresponding to the target pixel region, and may image-process the target pixel region with higher resolution based on the calculated pixel values of the target pixel region.

On the other hand, in response to the motion size of the target pixel region being greater than or equal to the predetermined value, and thus, the second pixel value corresponding to the target pixel region not being loaded into the internal memory, the processor 130 may calculate pixel values of the target pixel region based on the first pixel value corresponding to the target pixel region, and may process the target pixel region with a lower resolution based on the calculated pixel values of the target pixel region.

That is, in response to the motion size of the target pixel region being greater than or equal to the predetermined value, and thus, the second pixel value corresponding to the target pixel region not being loaded into the internal memory, the processor 130 may calculate the second pixel value corresponding to the target pixel region based on the first pixel value corresponding to the target pixel region.

According to an exemplary embodiment, in response to the motion size of the target pixel region being greater than or equal to the predetermined value, and thus, the second pixel value corresponding to the target pixel region not being loaded into the internal memory, the processor 130 may calculate the second pixel value of the target pixel region based on the first pixel value of the pixel block corresponding to the target pixel region and the first pixel value of at least one adjacent pixel block.

According to an exemplary embodiment, in response to the motion size of the target pixel region being greater than or equal to the predetermined value, and thus, the second pixel value corresponding to the target pixel region not being loaded into the internal memory, the processor 130 may calculate the second pixel value of the target pixel region based on the first pixel value of the pixel block corresponding to the target pixel region.

In response to the pixel values corresponding to the target pixel region being calculated, the processor 130 may image-process the target pixel region with a higher resolution when the motion size of the target pixel region is less than the predetermined value, and with a lower resolution when the motion size of the target pixel region is equal to or greater than the predetermined value, based on the calculated pixel values of the target pixel region.

As described above, the processor 130 may individually store the plurality of grouped pixels forming at least one of the first and second reference frames in the memory 120 according to an exemplary embodiment.

For example, the processor 130 may divide at least one of the first and second reference frames into a plurality of pixel blocks including a plurality of pixels, and may group pixel values of representative pixels in the plurality of pixel blocks. Thereafter, the processor 130 may group difference values between the representative pixel and at least one other pixel, and may individually store the grouped values in the memory 120.

In this case, in response to the motion size of the target pixel region being less than the predetermined value, and thus, the difference value between the representative pixel of the target pixel region and at least one other pixel being loaded into the internal memory, the processor 130 may calculate a pixel value of the at least one other pixel based on the pixel value of the representative pixel and the difference value between the representative pixel and the at least one other pixel. Thereafter, the processor 130 may calculate the pixel values of the target pixel region based on the pixel value of the representative pixel of the target pixel region and the calculated pixel value of the at least one other pixel, and may image-process the target pixel region with a higher resolution based on the calculated pixel values of the target pixel region.

On the other hand, in response to the motion size of the target pixel region being greater than or equal to the predetermined value, and thus, the second pixel value corresponding to the target pixel region not being loaded into the internal memory, the processor 130 may calculate the pixel values of the target pixel region based on the first pixel input value corresponding to the target pixel region as described above, and may image-process the target pixel region with a lower resolution based on the calculated pixel values of the target pixel region.

Figure 2:
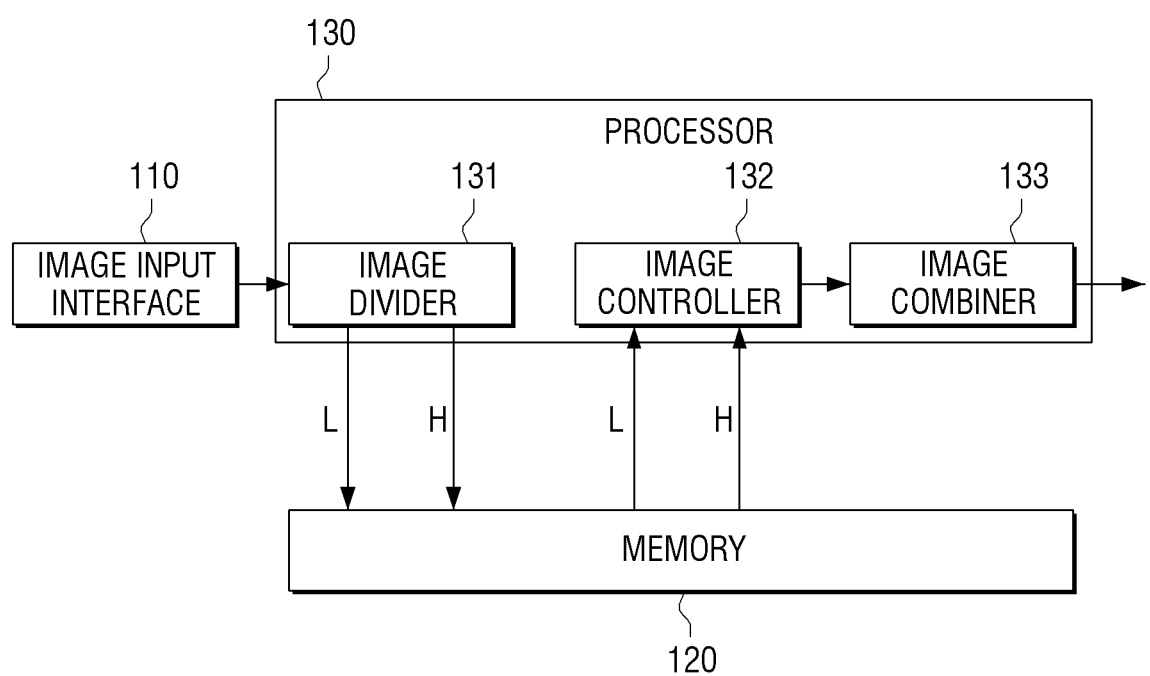
FIG. 2 is a block diagram of a processor according to an exemplary embodiment.

FIG. 2 is a detailed block diagram of the processor according to an exemplary embodiment.

As shown in FIG. 2, the processor 130 may include an image divider 131, an image controller 132, and an image combiner 133.

In response to an image content being input through the image input interface 110, the image divider 131 may group a plurality of pixels forming at least one of a plurality of image frames forming the input image content according to a predetermined criterion, and may store the grouped pixels in the memory 120.

Specifically, the image divider 131 may divide at least one of a first reference frame which is a previous image frame and a second reference frame which is a current image frame into a plurality of pixel blocks including a plurality of pixels, and may group pixels with corresponding positions in each of the plurality of pixel blocks, and store the grouped pixels in the memory 120.

The image controller 132 may load, into the internal memory, pixel values corresponding to a predetermined search range, with reference to a target pixel region of an interpolation frame, with respect to a first pixel group from among the pixel groups stored in the memory 120. In addition, the image controller 132 may load, into the internal memory, pixel values of a range which is smaller than the predetermined search range, with reference to a target pixel region of an interpolation frame, with respect to the a second pixel group stored in the memory 120.

The image controller 132 may then acquire at least one of a first pixel value corresponding to the first pixel group loaded into the internal memory and a second pixel value corresponding to the second pixel group according to a motion size of the target pixel region, and may output the acquired pixel value to the image combiner 133. Accordingly, the image combiner 133 may calculate pixel values of the target pixel region based on at least one of the first pixel value corresponding to the first pixel group and the second pixel value corresponding to the second pixel group, and may image-process the target pixel region with a higher resolution or a lower resolution based on the calculated pixel values of the target pixel region.

Specifically, in response to the motion size of the target pixel region being less than a predetermined value, and thus, the second pixel value corresponding to the target pixel region being loaded into the internal memory, the image controller 132 may acquire the first pixel value of the first pixel group corresponding to the target pixel region and the second pixel value of the second pixel group corresponding to the target pixel region from the internal memory, and may output the acquired pixel values to the image combiner 133. Accordingly, the image combiner 133 may image-process the target pixel region with a higher resolution based on the first and second pixel values output from the image controller 132.

On the other hand, in response to the motion size of the target pixel region being greater than or equal to the predetermined value, and thus, the second pixel value corresponding to the target pixel region not being loaded into the internal memory, the image controller 132 may acquire the first pixel value of the first pixel group corresponding to the target pixel region from the internal memory. The image controller 132 may then calculate the second pixel value corresponding to the target pixel region based on the acquired first pixel value, and may output the first pixel value of the first pixel group corresponding to the target pixel region and the calculated second pixel value to the image combiner 133. Accordingly, the image combiner 133 may image-process the target pixel region with a lower resolution based on the pixel values output from the image controller 132.

Figure 3:
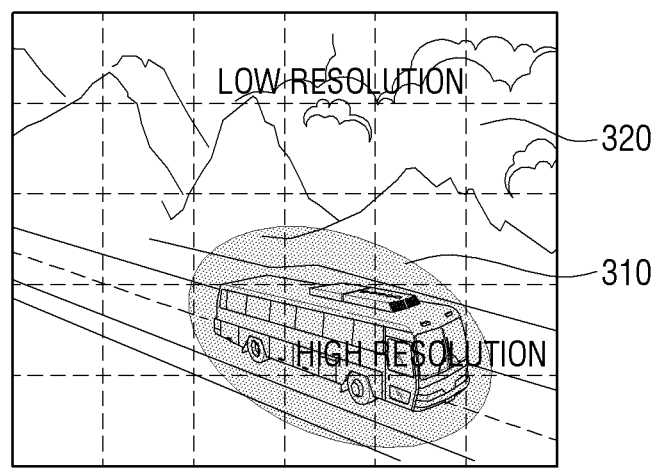
FIG. 3 is a diagram showing an example of a reference frame being divided into a plurality of pixel blocks according to an exemplary embodiment.
Figure 4:
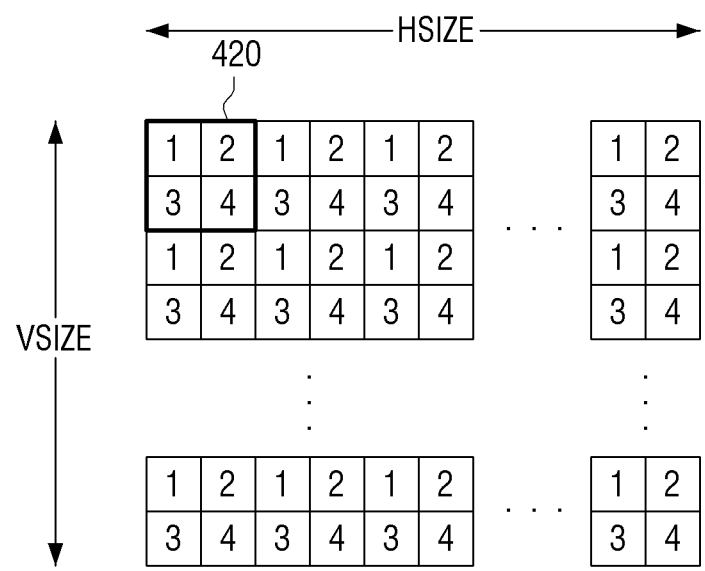
FIG. 4 is a diagram showing an example of a plurality of pixel blocks each including a plurality of pixels in a reference frame according to an exemplary embodiment.

FIG. 3 is a diagram showing an example of dividing a reference frame into a plurality of pixel blocks according to one exemplary embodiment, and FIG. 4 is a diagram showing an example of a plurality of pixel blocks each including a plurality of pixels in a reference frame according to one exemplary embodiment.

As shown in FIG. 3, in the input reference frame, a first region 310 may be a region in which a motion size is less than a predetermined value in comparison to a previous reference frame, and a second region 320, may be a region in which a motion size is greater than or equal to the predetermined value.

In response to such a reference frame being input, the image processing apparatus 100 may divide the input reference frame into a plurality of pixel blocks. Each of the plurality of pixel blocks includes a plurality of pixels. That is, the image processing apparatus 100 may divide the reference frame into pixel blocks in various patterns according to a change in a motion of the image.

In response to the change in the motion of the image being greater, the image processing apparatus 100 may divide the reference frame into pixel blocks 420 in a 4×4 pattern as shown in FIG. 4. However, exemplary embodiments are not limited thereto. In response to the change in the motion of the image being smaller, the image processing apparatus 100 may divide the reference frame into pixel blocks with a higher number of patterns than a 4×4 pattern, for example, in a 8×8 pattern or a 16×16 pattern.

In response to the reference frame being divided into the plurality of pixel blocks including first to fourth pixels, the image processing apparatus 100 may group the pixels with a corresponding position in each of the plurality of pixel blocks, and store the grouped pixels in the memory 120.

For example, the image processing apparatus 100 may group the first pixels included in the plurality of pixel blocks and may group the second pixels included in the plurality of pixel blocks, and may store the grouped pixels in the memory 120. In addition, the image processing apparatus 100 may group the third pixels included in the plurality of pixel blocks and may group the fourth pixels included in the plurality of pixel blocks, and may store the grouped pixels in the memory 120.

Accordingly, the memory 120 may store a first pixel group of the first pixels included in the plurality of pixel blocks, a second pixel group of the second pixels included in the plurality of pixel blocks, a third pixel group of the third pixels included in the plurality of pixel groups, and a fourth pixel group of the fourth pixels included in the plurality of pixel blocks.

Accordingly, the processor 130 of the image processing apparatus 100 may load, into the internal memory, pixel values corresponding to a predetermined search range, with reference to a target pixel region of an interpolation frame, with respect to the first pixel group from among the first to fourth pixel groups stored in the memory 120, and may load, into the internal memory, pixel values of a range which is smaller than the predetermined search range with respect to the other pixel groups stored in the memory 120.

Hereinafter, an operation of image-processing a target pixel region of an interpolation frame with a lower resolution or a higher resolution according to a motion size of the target pixel region according to an exemplary embodiment will be described in detail.

Figure 5:
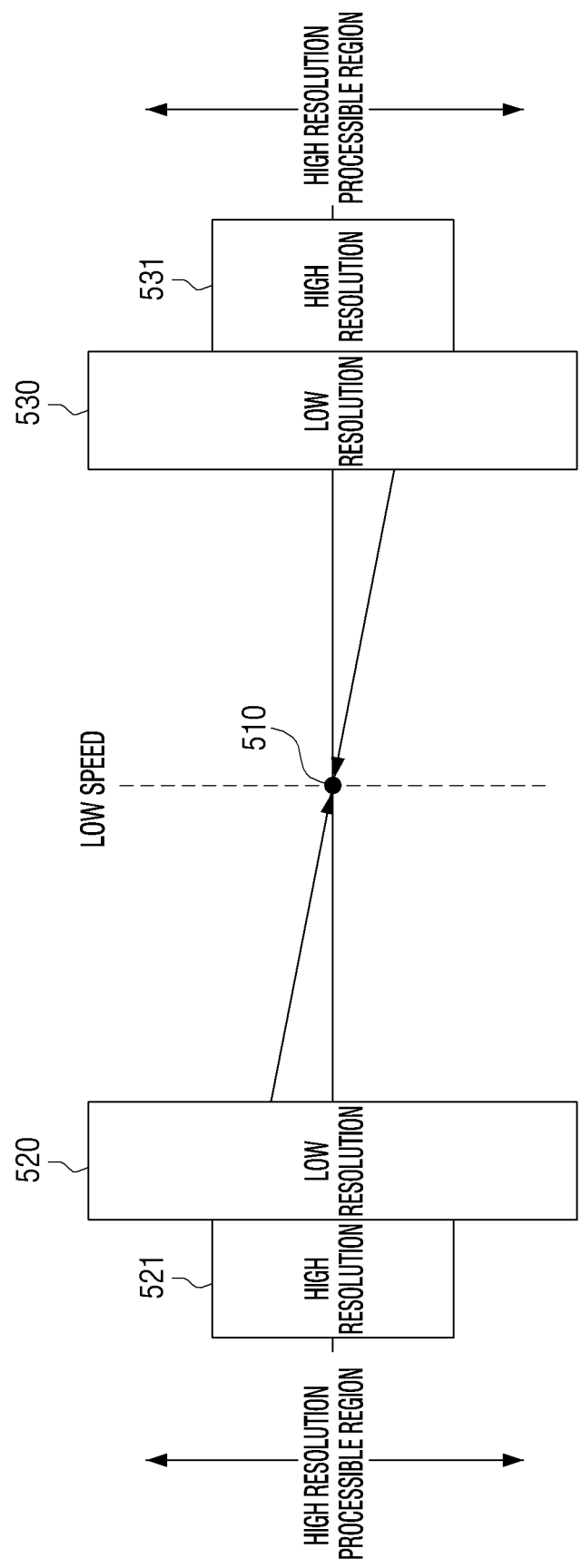
FIG. 5 is a diagram showing an example of using a pixel value loaded into an internal memory according to a motion size of a target pixel region of an interpolation frame in an image processing apparatus according to an exemplary embodiment.
Figure 6:
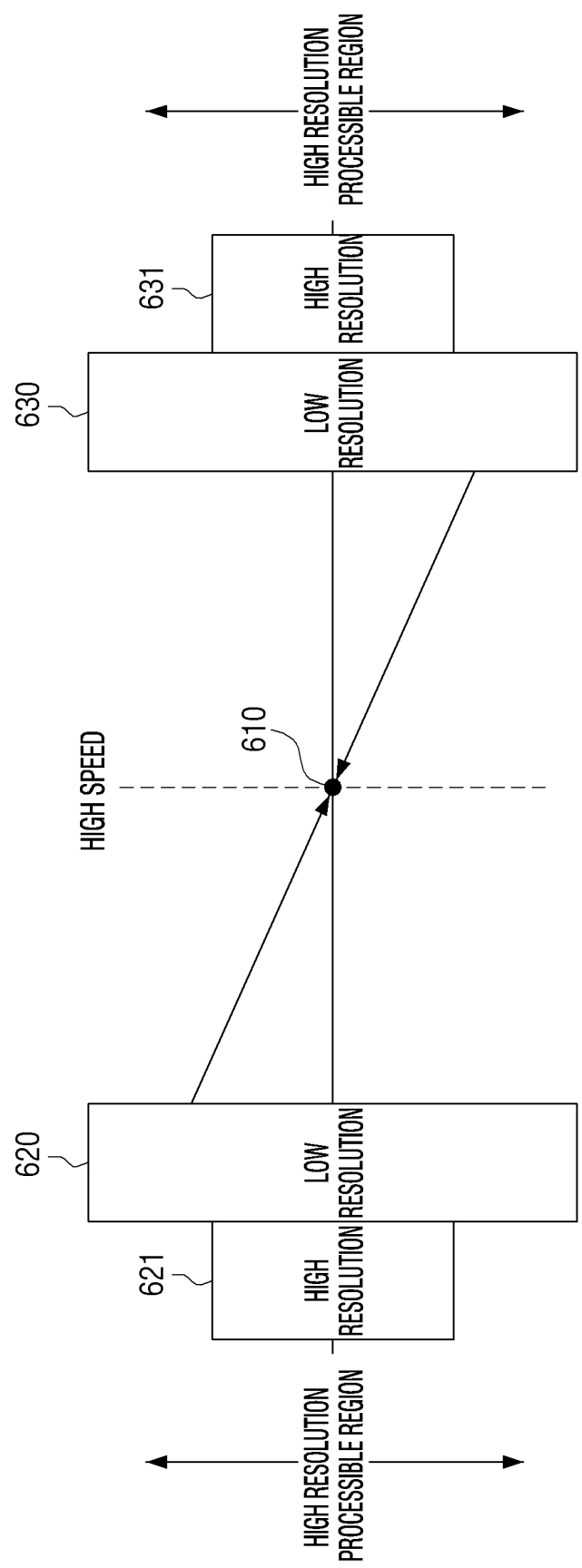
FIG. 6 is a diagram showing an example of using a pixel value loaded into an internal memory according to a motion size of a target pixel region of an interpolation frame in an image processing apparatus according to another exemplary embodiment.

FIG. 5 is a diagram showing a first example of using pixel values loaded into the internal memory according to a motion size of a target pixel region of an interpolation frame in the image processing apparatus 100 according to an exemplary embodiment, and FIG. 6 is a diagram showing a second example of using pixel values loaded into the internal memory according to a motion size of a target pixel region of an interpolation frame in the image processing apparatus 100 according to another exemplary embodiment.

As shown in FIG. 5, the image processing apparatus 100 may perform image processing with respect to a target pixel region 510 of an interpolation frame to be inserted between a first reference frame which is a previous image frame and a second reference frame which is a current image frame.

For example, in order to perform image processing with respect to the target pixel region 510 of the interpolation frame, the image processing apparatus 100 may load, into the internal memory, a pixel value 520 corresponding to a predetermined search range with reference to the target pixel region 510 with respect to a first pixel group from among the plurality of pixel groups of the first reference frame which is a previous image frame stored in the memory 120. In addition, the image processing apparatus 100 may load, into the internal memory, a pixel value 521 of a range which is smaller than the predetermined search range with respect to a second pixel group from among the plurality of pixel groups of the first reference frame which is the previous image frame stored in the memory 120.

Likewise, in order to perform image processing with respect to the target pixel region 510 of the interpolation frame, the image processing apparatus 100 may load, into the internal memory, a pixel value 530 corresponding to the predetermined search range with reference to the target pixel region 510 with respect to a first pixel group from among the plurality of pixel groups of the second reference frame which is a current image frame stored in the memory 120. In addition, the image processing apparatus 100 may load, into the internal memory, a pixel value 531 of a range which is smaller than the predetermined search range with respect to a second pixel group from among the plurality of pixel groups of the second reference frame which is the current image frame stored in the memory 120.

Thereafter, the image processing apparatus 100 may determine a motion size of the target pixel region 510 based on a motion vector of each pixel corresponding to the target pixel region 510 from among the pixels forming each of the first and second reference frames. After that, the image processing apparatus 100 may calculate pixel values of the target pixel region 510 based the pixel values of at least one of the first and second reference frames loaded into the internal memory based on the motion size of the target pixel region 510.

As shown in FIG. 5, in response to the motion size of the target pixel region 510 being less than a predetermined value, pixel values acquired from the first pixel group of each of the first and second reference frames and pixel values acquired from the second pixel group may be loaded into and stored in the internal memory.

Accordingly, the image processing apparatus 100 may acquire a first pixel value corresponding to the target pixel region 510 from among the pixel values of the first pixel group of at least one of the first and second reference frames stored in the internal memory based on the motion size of the target pixel region 510, and may acquire a second pixel value corresponding to the target pixel region 510 from among the pixel values of the second pixel group.

In response to the first and second pixel values corresponding to the target pixel region 510 being acquired, the image processing apparatus 100 may calculate the pixel values of the target pixel region 510 based on the first and second pixel values, and may image-process the target pixel region 510 with a higher resolution based on the calculated pixel values.

As shown in FIG. 6, the image processing apparatus 100 may perform image processing with respect to a target pixel region 610 of an interpolation frame to be inserted between a first reference frame which is a previous image frame and a second reference frame which is a current image frame.

For example, in order to perform image processing with respect to the target pixel region 610 of the interpolation frame, the image processing apparatus 100 may load, into the internal memory, a pixel value 620 corresponding to a predetermined search range with reference to the target pixel region 610 with respect to a first pixel group from among the plurality of pixel groups of the first reference frame which is a previous image frame stored in the memory 120. In addition, the image processing apparatus 100 may load, into the internal memory, a pixel value 621 of a range which is smaller than the predetermined search range with respect to a second pixel group from among the plurality of pixel groups of the first reference frame which is the previous image frame stored in the memory 120.

Likewise, in order to perform image processing with respect to the target pixel region 610 of the interpolation frame, the image processing apparatus 100 may load, into the internal memory, a pixel value 630 corresponding to the predetermined search range with reference to the target pixel region 610 with respect to a first pixel group from among the plurality of pixel groups of the second reference frame which is a current image frame stored in the memory 120. In addition, the image processing apparatus 100 may load, into the internal memory, a pixel value 631 of a range which is smaller than the predetermined search range with respect to a second pixel group from among the plurality of pixel groups of the second reference frame which is the current image frame stored in the memory 120.

Thereafter, the image processing apparatus 100 may determine a motion size of the target pixel region 610 based on a motion vector of each pixel corresponding to the target pixel region 610 from among the pixels forming each of the first and second reference frames. After that, the image processing apparatus 100 may calculate pixel values of the target pixel region 610 based the pixel values of at least one of the first and second reference frames loaded into the internal memory based on the motion size of the target pixel region 610.

As shown in FIG. 6, in response to the motion size of the target pixel region 610 being greater than or equal to a predetermined value, pixel values acquired from the first pixel group of each of the first and second reference frames may be loaded into and stored in the internal memory.

Accordingly, the image processing apparatus 100 may acquire a first pixel value corresponding to the target pixel region 610 from among the pixel values of the first pixel group of at least one of the first and second reference frames stored in the internal memory based on the motion size of the target pixel region 610. Thereafter, the image processing apparatus 100 may calculate a second pixel value corresponding to the target pixel region 610 based on the calculated first pixel value corresponding to the target pixel region 610.

As described above, in response to the first pixel value corresponding to the target pixel region 610 being acquired and the second pixel value being calculated based on the first pixel value, the image processing apparatus 100 may calculate the pixel values of the target pixel region 610 based on the first pixel value and the calculated second pixel value, and may image-process the target pixel region 610 with a lower resolution based on the calculated pixel values.

Figure 7:
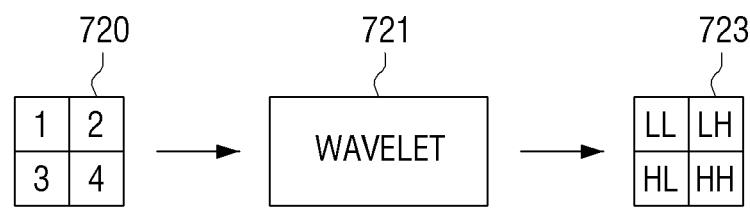
FIG. 7 is a diagram showing an example of grouping a plurality of pixels and storing the grouped pixels in a memory in an image processing apparatus according to an exemplary embodiment.

FIG. 7 is a diagram showing an example of grouping a plurality of pixels in the image processing apparatus and storing the pixels in the memory according to an exemplary embodiment.

As shown in FIG. 7, in response to a first image frame being input from among a plurality of image frames forming an image content, the image processing apparatus 100 may classify the plurality of pixels forming the first image frame on a pixel block basis.

As shown in FIG. 7, a plurality of pixel blocks including a first pixel block 720 may include first to fourth pixels. In this case, the image processing apparatus 100 may group representative pixels of the plurality of pixel blocks into the same pixel group, and may group difference values between the representative pixel and the other pixels, and store the difference values in the memory 120.

For example, in the first pixel block 720, the image processing apparatus 100 may set the first pixel from among the first to fourth pixels included in the first pixel block 720 as a representative pixel. In response to the first pixel being set as the representative pixel, the image processing apparatus 100 may calculate a difference value between the first pixel and the second pixel, a difference value between the first pixel and the third pixel, and a difference value between the first pixel and the fourth pixel through wavelet transform 721. Accordingly, the image processing apparatus 100 may generate a new 1-1 pixel block 723 including a pixel value of the first pixel which is the representative pixel in the first pixel block 720 including pixel values of the first to fourth pixels, and difference values between the first pixel and the other pixels through the wavelet transform 721.

With respect to the other pixel blocks, the image processing apparatus 100 may calculate difference values between the first pixel which is the representative pixel and the other pixels in the same method as the first pixel block 720, and may generate a new pixel block based on the calculated values.

Thereafter, the image processing apparatus 100 may group representative pixels included in the plurality of pixel blocks including the 1-1 pixel block 723 into a first pixel group and group the difference values between the first pixel and each of the other pixels into the same group, and may store the groups in the memory 120. That is, the image processing apparatus 100 may group the representative pixels corresponding to the plurality of pixel blocks including the first pixel block 720 into the first pixel group and store the first pixel group in the memory 120. In addition, the image processing apparatus 100 may group the difference values calculated between the representative first pixels and the second pixels of a corresponding position of the plurality of pixel blocks into a second pixel group, may group the difference values calculated between the representative first pixels and the third pixels of a corresponding position of the plurality of pixel blocks into a third pixel group, and may group the difference values calculated between the representative first pixels and the fourth pixels of a corresponding position of the plurality of pixel blocks into a fourth pixel group, and may store the pixel groups in the memory 120.

However, the exemplary embodiments are not limited thereto. The image processing apparatus 100 may group pixels placed at the same position from among the pixels included in the plurality of pixel blocks including the first pixel block 720, and may store the group in the memory 120. That is, the image processing apparatus 100 may group the first pixels of the corresponding position of the plurality of pixel blocks including the first pixel block 720 into the first pixel group, and may group the second pixels of the corresponding position of the plurality of pixel blocks into the second pixel group, may group the third pixels of the corresponding position of the plurality of pixel blocks into the third pixel group, and may group the fourth pixels of the corresponding position of the plurality of pixel blocks into the fourth pixel group, and may store the groups in the memory 120.

Figure 8:
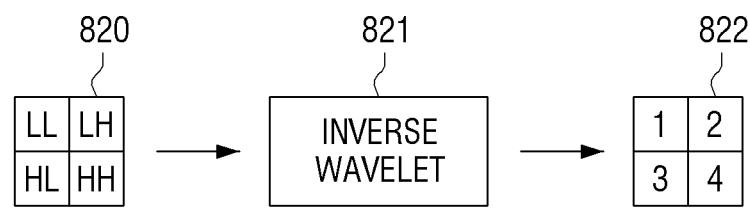
FIG. 8 is a view diagram an example of image-processing a target pixel region with a higher resolution in an image processing apparatus according to an exemplary embodiment.

FIG. 8 is a diagram showing an example of image-processing a target pixel region with a higher resolution in the image processing apparatus according to an exemplary embodiment.

As shown in FIG. 8, in response to a motion size of a target pixel region of an interpolation frame being less than a predetermined value, the image processing apparatus 100 may acquire, from the internal memory, a first pixel value of a representative pixel corresponding to the target pixel region and second pixel values of the other pixels related to the representative pixel. Herein, the second pixel values may be difference values between the first pixel which is the representative pixel and each of the other pixels of the plurality of pixels included in a pixel block.

As shown in FIG. 8, in response to the first pixel value of the representative pixel corresponding to the target pixel region and the difference values corresponding to the other pixels being acquired, the image processing apparatus 100 may calculate the pixel values of the other pixels through inverse wavelet transform. Thereafter, the image processing apparatus 100 may image-process the target pixel region with a higher resolution based on a pixel block 822 which includes the acquired first pixel value of the representative pixel and the calculated pixel values of the other pixels.

However, the exemplary embodiments are not limited thereto. In response to the motion size of the target pixel region of the interpolation frame being less than the predetermined value, the image processing apparatus 100 may acquire the first pixel value of the representative pixel corresponding to the target pixel region and the second pixel values of the other pixels related to the representative pixel from the internal memory.

In response to the first and second pixel values being acquired, the image processing apparatus 100 may image-process the target pixel region with a higher resolution based on the acquired first and second pixel values.

On the other hand, in response to the motion size of the target pixel region being greater than or equal to the predetermined value, the image processing apparatus 100 may acquire the pixel value of the representative pixel corresponding to the target pixel region, and may calculate the pixel values of the other pixels related to the representative pixel based on the acquired pixel value of the representative pixel.

Figure 9:
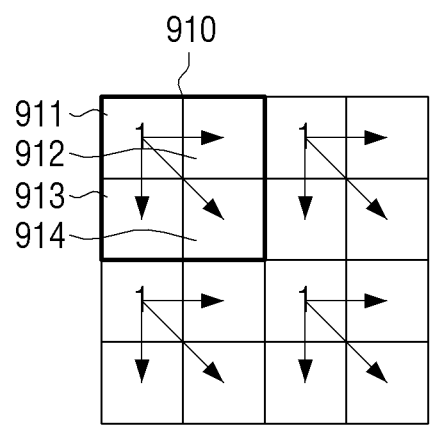
FIG. 9 is a diagram showing an example of image-processing a target pixel region with a lower resolution in an image processing apparatus according to an exemplary embodiment.

FIG. 9 is a diagram showing an example of performing image-processing with respect to a target pixel region with a lower resolution in the image processing apparatus according to an exemplary embodiment.

In response to the motion size of the target pixel region of the interpolation frame being greater than or equal to the predetermined value, the image processing apparatus 100 may acquire the pixel value of the representative pixel corresponding to the target pixel region from the internal memory.

In response to the pixel value of the representative pixel corresponding to the target pixel region being acquired as described above, the image processing apparatus 100 may determine the pixel values of the other pixels included in the same pixel block as that of the representative pixel based on the pixel value of the representative pixel.

As shown in FIG. 9, a first pixel 911 included in a first pixel block 910 may be a representative pixel corresponding to the target pixel region. In this case, the image processing apparatus 100 may set the pixel value of the second to fourth pixels 912 to 914 to be the same as the pixel value of the first pixel 911.

As described above, in response to the pixel values of the second to fourth pixels 912 to 914 included in the first pixel block 910 being determined based on the pixel value of the first pixel 911, the image processing apparatus 100 may perform image processing with respect to the target pixel region based on the pixel values of the first to fourth pixels 911 to 914. That is, the pixel values of the second to fourth pixels 912 to 914 included in the same first pixel block 910 as the first pixel 911 may be set to the same value as the pixel value of the first pixel 911, such that image processing apparatus 100 performs image processing with a lower resolution based on the pixel values of the first to fourth pixels 911 to 914.

Figure 10A:
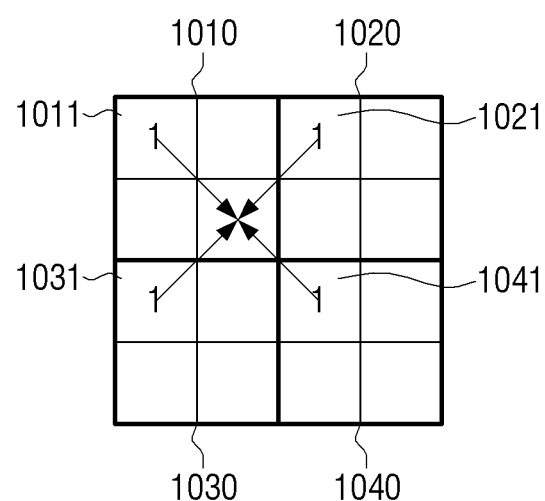
FIGS. 10A and 10B are diagrams showing an example of image-processing a target pixel region with a lower resolution in an image processing apparatus according to another exemplary embodiment.
Figure 10B:
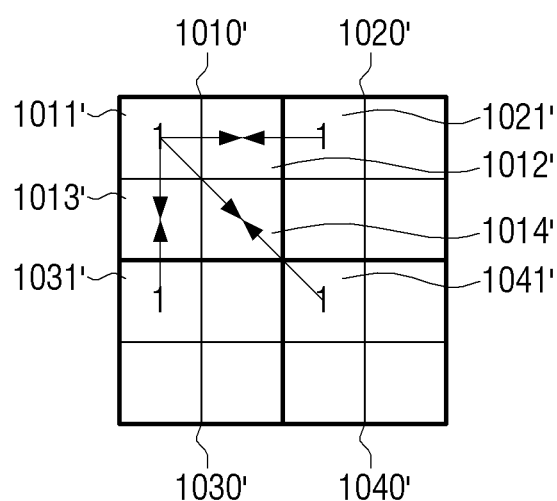

FIGS. 10A and 10B are diagrams of an example of performing image processing with respect to a target pixel region with a lower resolution in the image processing apparatus according to an exemplary embodiment.

In response to the motion size of the target pixel region of the interpolation frame being greater than or equal to the predetermined value, the image processing apparatus 100 may acquire the pixel value of the representative pixel corresponding to the target pixel region from the internal memory.

In response to the pixel value of the representative pixel corresponding to the target pixel region being acquired as described above from the internal memory, the image processing apparatus 100 may determine the pixel values of the other pixels included in the same pixel block as that of the representative pixel based on the pixel value of the representative pixel.

As shown in FIG. 10A, a first pixel 1011 included in a first pixel block 1010 may be a representative pixel corresponding to the target pixel region. In this case, the image processing apparatus 100 may acquire pixel values of first pixels 1021 to 1041 of positions corresponding to the first pixel 1011 of the first pixel block 1010 from surrounding pixel blocks 1020 to 1040 adjacent to the first pixel block 1010.

Thereafter, the image processing apparatus 100 may calculate pixel values of the other pixels included in the first pixel block 1010 based on the pixel values of the first pixels 1011 to 1041 of corresponding positions in the first to fourth pixel blocks 1010 to 1040.

For example, the image processing apparatus 100 may calculate the pixel values of the other pixels included in the first pixel block 1010 based on an average value of the pixel values of the first pixels 1011 to 1041 of corresponding positions in the first to fourth pixel blocks 1010 to 1040.

Thereafter, the image processing apparatus 100 may perform image processing with a lower resolution based on the pixel value of the first pixel 1011 included in the first pixel block 1010 and the calculated pixel values of the other pixels in the first pixel block 1010.

As shown in FIG. 10B, a first pixel 1011' included in a first pixel block 1010' may be a representative pixel corresponding to the target pixel region. In this case, the image processing apparatus 100 may acquire pixel values of first pixels 1021' to 1041' of positions corresponding to the first pixel 1011' of the first pixel block 1010' based on the second to fourth pixel blocks 1020' to 1040' adjacent to the first pixel block 1010'.

Thereafter, the image processing apparatus 100 may calculate pixel values of the other pixels included in the first pixel block 1010' based on the pixel values of the first pixels 1021' to 1041' acquired from the second to fourth pixel blocks 1020' to 1040'.

As shown in FIG. 10B, the image processing apparatus 100 may calculate a pixel value of the second pixel 1012' included in the first pixel block 1010' based on the pixel value of the first pixel 1011' included in the first pixel block 1010' and the pixel value of the first pixel 1021' included in the second pixel block 1020' adjacent to the first pixel block 1010'.

In addition, the image processing apparatus 100 may calculate a pixel value of the third pixel 1013' included in the first pixel block 1010' based on the pixel value of the first pixel 1011' included in the first pixel block 1010' and the pixel value of the first pixel 1031' included in the third pixel block 1030' adjacent to the first pixel block 1010'.

In addition, the image processing apparatus 100 may calculate a pixel value of the fourth pixel 1014' included in the first pixel block 1010' based on the pixel value of the first pixel 1011' included in the first pixel block 1010' and the pixel value of the first pixel 1041' included in the fourth pixel block 1040' adjacent to the first pixel block 1010'.

Thereafter, the image processing apparatus 100 may perform image processing with a lower resolution based on the pixel value of the first pixel 1011' included in the first pixel block 1010' and the pixel values of the calculated second to fourth pixels 1012' to 1014' included in the first pixel block 1010'.

Figure 11:
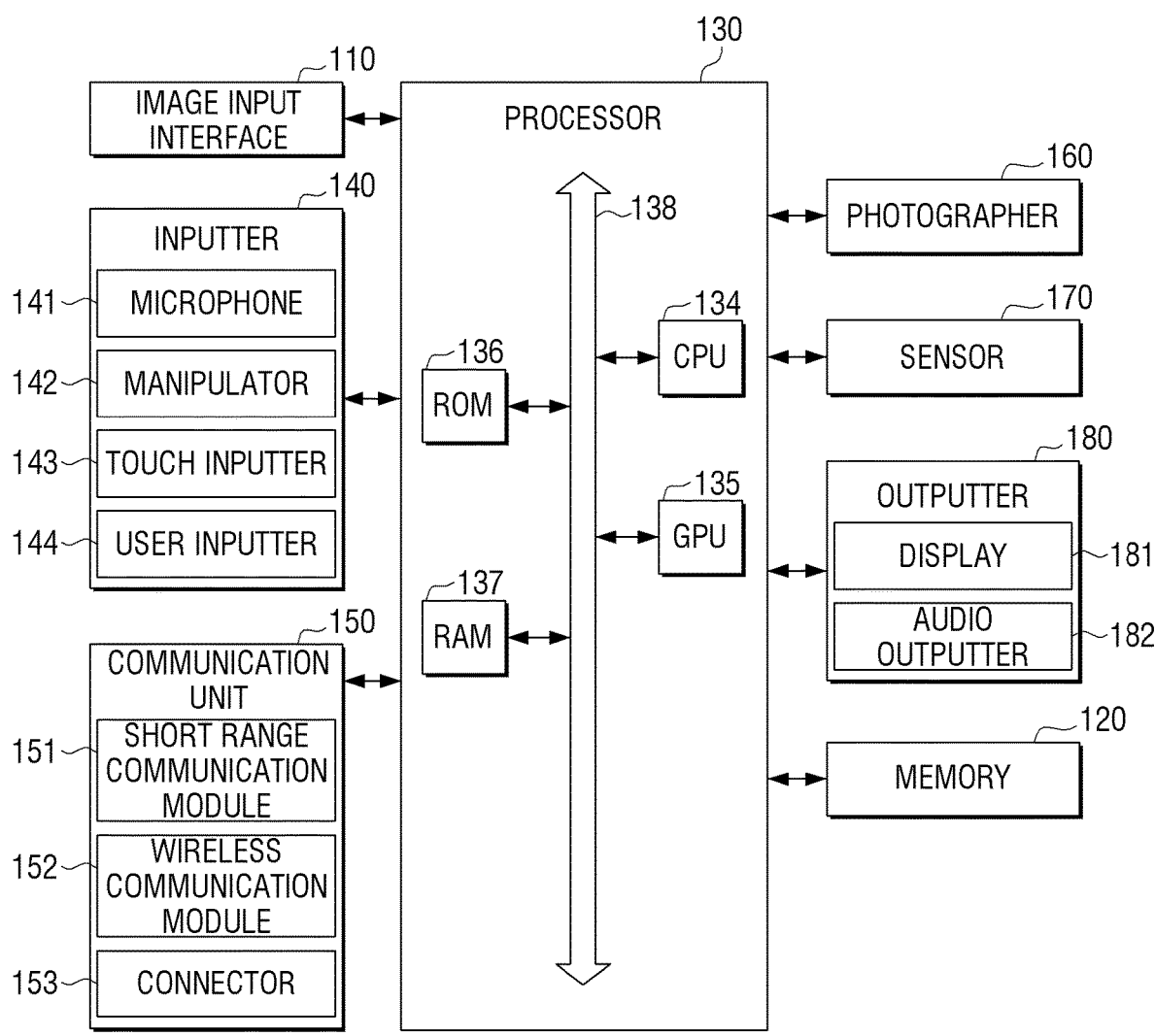
FIG. 11 is a detailed block diagram of an image processing apparatus according to an exemplary embodiment.

According to an exemplary embodiment, when the above-described image processing apparatus 100 is implemented by using a display apparatus such as a smartphone or a smart TV, the image processing apparatus 100 may further include elements shown in FIG. 11 in addition to the image input interface 110, the memory 120, and the processor 130 described above.

FIG. 11 is a detailed block diagram of the image processing apparatus according to an exemplary embodiment.

As shown in FIG. 11, when the image processing apparatus 100 is implemented by using a display apparatus such as a smartphone or a smart TV, the image processing apparatus 100 may further include an inputter 140, a communication unit 150, a photographer 160, a sensor 170, and an outputter 180, in addition to the image input interface 110, the memory 120, and the processor 130 described above.

The inputter 140, through which various user commands are received and then transmitted to the processor 130, may include, for example, a microphone 141, a manipulator 142, a touch inputter 143, and a user inputter 144.

The microphone 141 may receive a user's voice command, and the manipulator 142 may be implemented by using a key pad provided with various function keys, number keys, special keys, character keys, or the like. In addition, the touch inputter 143 may be implemented by using, for example, a touch pad having a mutually layered structure with a display 181 when the display 181 is implemented in the form of a touch screen. In this case, the touch inputter 143 may receive a selection command related to at least one of an icon related to various applications displayed through the display 181 and an execution UI of a running application. However, exemplary embodiments are not limited thereto.

The user inputter 144 may receive an infrared (IR) signal or a radio frequency (RF) signal for controlling the operation of the image processing apparatus 100 from at least one external device such as a remote control device.

The communication unit 150 may receive an image content by performing data communication with pre-registered plurality of external devices, an external content server, a web server, or the like.

The communication unit 150 may include a short range communication module 151, a wireless communication module 152 such as a wireless local area network (LAN) module, and a connector 153 such as a high-definition multimedia interface (HDMI), a universal serial bus (USB), Institute of Electrical and Electronics Engineers (IEEE) 1394, etc.

The short range communication module 151 may be a communication module for performing data communication by performing wireless communication with pre-registered plurality of external devices, and may include at least one of a Bluetooth module, an infrared data association (IrDA) module, a near field communication (NFC) module, a WiFi module, and a Zigbee module, etc.

In addition, the wireless LAN module is a module which is connected with an external network according to a wireless communication protocol such as IEEE to perform communication, and may perform data communication with a web server, a content server, or the like.

The wireless communication module 152 may further include a mobile communication module for accessing a mobile communication network according to various mobile communication standards such as $3^{rd}$ generation (3G), $3^{rd}$ Generation Partnership Project (3GPP), Long Term Evolution (LTE), and performing communication.

As described above, the communication unit 150 may be implemented in various short range communication methods described above, but exemplary embodiments are not limited thereto, and the communication unit 150 may employ other communication technologies.

The connector 153 is configured to provide an interface with various source devices such as USB 2.0, USB 3.0, HDMI, IEEE 1394, or the like. Such a wire communication module may receive content data transmitted from an external server through a wire cable according to a control command, or may transmit pre-stored content data to an external recording medium. In addition, the wire communication module may receive power from a power source through a wire cable.

The photographer 160 is configured to photograph a still image or a moving image according to a user command, and may be implemented by using a plurality of cameras such as a front camera and a rear camera.

The sensor 170 is a detection sensor for detecting, for example, ambient brightness and a motion of the image processing apparatus 100 which is implemented by using a motile terminal device such as a smart phone. The sensor 170 may include an illuminance sensor, a motion sensor, a geomagnetic sensor, a gravity sensor, and a gyroscope sensor, etc.

For example, the illuminance sensor may detect brightness of an ambient environment, and the motion sensor (accelerometer sensor) may be an acceleration sensor for measuring acceleration or an intensity of shock of moving the image processing apparatus 100 which is implemented by using a portable terminal device such as a smart phone. In addition, the geomagnetic sensor (magnetic sensor) may be a sensor for detecting azimuth using the Earth's magnetic field, and the gravity sensor may be a sensor for detecting in which direction the gravity works, and may automatically rotate the image according to a direction in which the user holds the image processing apparatus 100 and may detect a direction. Finally, the gyroscope sensor is a sensor that puts rotation to an existing motion sensor and recognizes six-axis directions, thereby recognizing a more minute and precise operation.

The outputter 180 may be configured to output at least one of image data and audio data of an image content, and may include a display 181 and an audio outputter 182.

The display 181 may be configured to display image-processed image data and the audio outputter 182 may be configured to output audio signal-processed audio data in an audible form.

The display 181 displaying image data may be implemented by using, for example, a liquid crystal display (LCD), an organic light emitting diode (OLED), or a plasma display panel (PDP), etc. In particular, the display 181 may be implemented in the form of a touch screen forming a mutually layered structure with the touch inputter 143, but exemplary embodiments are not limited thereto.

The processor 130 may include a central processing unit (CPU) 134, a graphic processing unit (GPU) 135, a read only memory (ROM) 136, and a random access memory (RAM) 137, and the CPU 134, the GPU 135, the ROM 136, and the RAM 137 may be connected with one another through a bus 138.

The CPU 134 may access the memory 120 and may perform booting using an operating system (OS) stored in the memory 120. In addition, the CPU 134 may perform various operations using various programs, content, data, or the like stored in the memory 120.

The GPU 135 may generate a display screen including various objects such as an icon, an image, a text, or the like. Specifically, the GPU 134 may calculate attribute values of objects to be displayed according to a layout of a screen, such as a coordinate value, a shape, a size, color, or the like, based on a received control command, and generate a display screen of various layouts including an object based on the calculated attribute values.

The ROM 136 may store a set of commands for booting a system. When a turn-on command is input and power is supplied, the CPU 136 may copy the OS stored in the memory 120 onto the RAM 132 according to the command stored in the ROM 136, execute the O/S and boots the system. When booting is completed, the CPU 134 may copy various programs stored in the storage 210 onto the RAM 137, execute the programs copied onto the RAM 137, and perform various operations.

The above-described processor 130 may be implemented as a system on chip (SoC) by being combined with the above-described elements.

The operation of the above-described processor 130 may be performed by a program stored in the memory 120. Herein, the memory 120 may be implemented by using at least one of a memory card (for example, an SD card, a memory stick) mountable to/dismountable from the ROM 136, the RAM 137, or the image processing apparatus 100, a nonvolatile memory, a volatile memory, a hard disk drive (HDD), or a solid state drive (SSD), etc.

Figure 12:
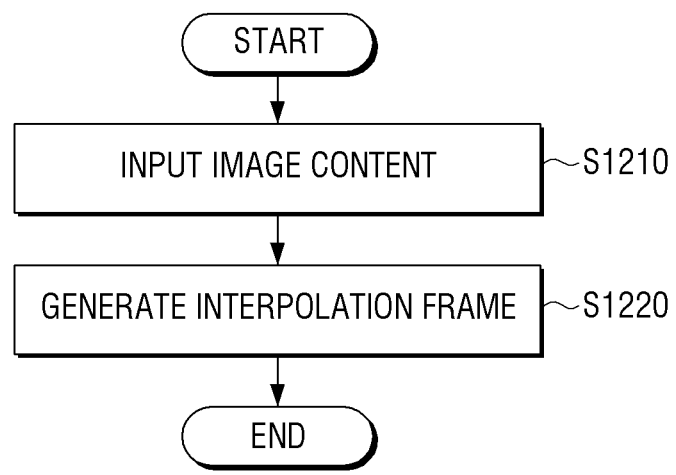
FIG. 12 is a flowchart showing a control method of an image processing apparatus according to an exemplary embodiment.

FIG. 12 is a flowchart showing a control method of the image processing apparatus according to an exemplary embodiment.

As shown in FIG. 12, the image processing apparatus 100 may receive an image content corresponding to a user command (S1210). In response to the image content being input, the image processing apparatus 100 may generate an interpolation frame based on at least two image frames which are at least continuous from among a plurality of image frames forming the input image content (S1220).

That is, the image processing apparatus 100 may generate an interpolation frame to be inserted between first and second reference frames based on the first reference frame which is a previously input image frame from among the plurality of image frames forming the image content, and the second reference frames which is a currently input image frame.

Figure 13:
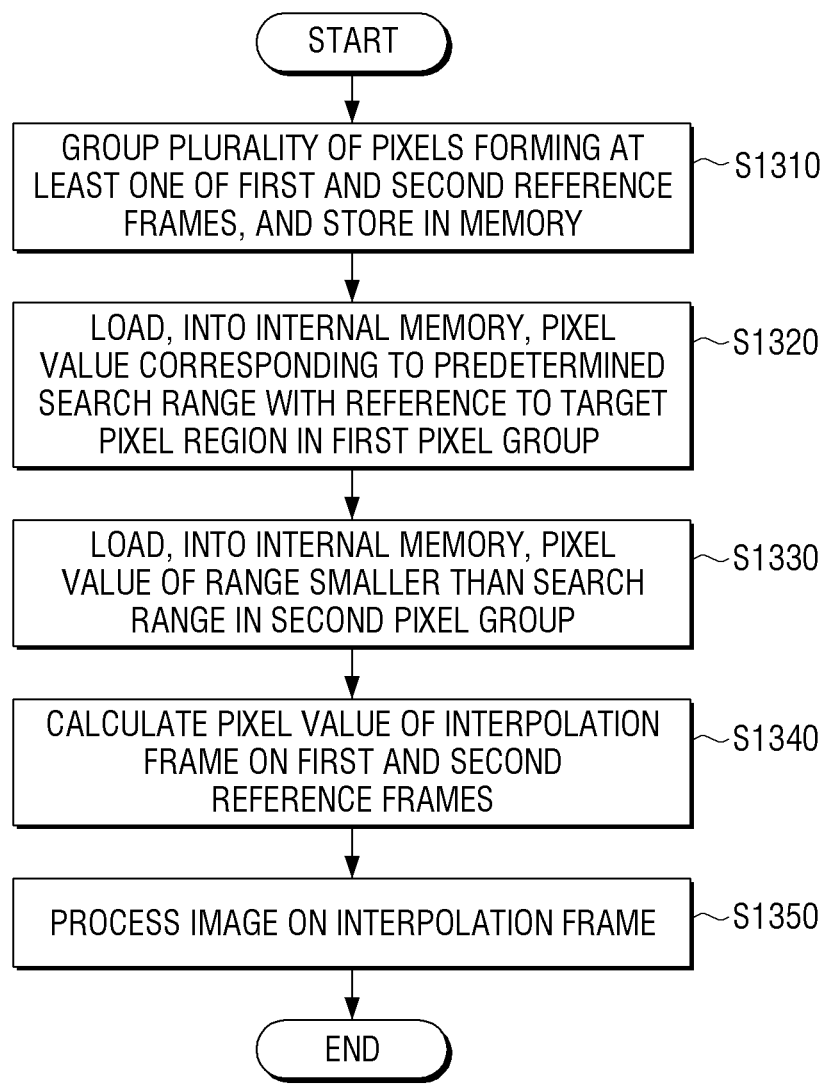
FIG. 13 is a flowchart showing a method for generating an interpolation frame in an image processing apparatus according to an exemplary embodiment.

FIG. 13 is a flowchart showing a method for generating an interpolation frame in the image processing apparatus according to an exemplary embodiment.

As shown in FIG. 13, the image processing apparatus 100 may group a plurality of pixels forming at least one of the first and second reference frames according to a predetermined criterion, and may individually store the plurality of pixel groups in the memory (S1310).

According to an exemplary embodiment, the image processing apparatus 100 may divide at least one of the first reference frame and the second reference frame into a plurality of pixel blocks including a plurality of pixels, may group pixels of corresponding positions in each of the plurality of pixel blocks, respectively, and may individually store the plurality of pixel groups in the memory.

According to an exemplary embodiment, the image processing apparatus 100 may divide at least one of the first reference frame and the second reference frame into a plurality of pixel blocks including a plurality of pixels, and may group pixel values of representative pixels in each of the plurality of pixel blocks. After that, the image processing apparatus 100 may group a difference value between the representative pixel and at least one other pixel, and individually store the grouped pixels in the memory.

In response to a plurality of grouped pixels being stored in the memory in relation to at least one of the first and second reference frames, the image processing apparatus may load, into an internal memory, pixel values corresponding to a predetermined search range, with reference to a target pixel region of the interpolation frame, with respect to at least one first pixel group from among the plurality of pixel groups stored in the memory (S1320). Thereafter, the image processing apparatus 100 may load, into the internal memory, pixel values of a range which is smaller than the predetermined search range with respect to a second pixel group of the plurality of pixel groups (S1330).

Thereafter, the image processing apparatus may calculate pixel values of the interpolation frame for the first and second reference frames forming the image content based on at least one of the first and second pixel groups loaded into the internal memory (S1340). Thereafter, the image processing apparatus may image-process the interpolation frame based on the calculated pixel values (S1340).

That is, the image processing apparatus may acquire at least one of a first pixel value corresponding to a first pixel group of at least one of the first reference frame and the second reference frame, and a second pixel value corresponding to a second pixel group based on a motion size of the target pixel region, and may calculate pixel values of the target pixel region. Thereafter, the image processing apparatus 100 may image-process the target frame with a higher resolution or a lower resolution based on the calculated pixel values.

Figure 14:
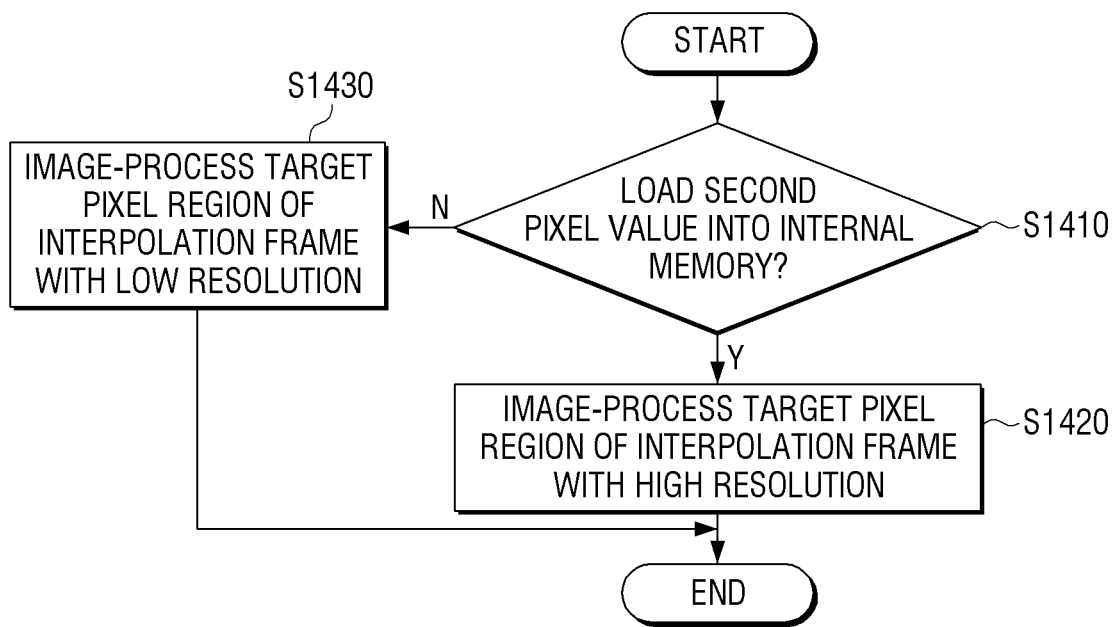
FIG. 14 is a flowchart showing a method for image-processing a target pixel region of an interpolation frame in an image processing apparatus according to an exemplary embodiment.

FIG. 14 is a flowchart showing a method for performing image processing with respect to a target pixel region of an interpolation frame in the image processing apparatus according to an exemplary embodiment.

As described above, the image processing apparatus 100 may divide at least one of first and second reference frames into a plurality of pixel blocks including a plurality of pixels, and may group pixels of corresponding positions in the plurality of pixel blocks, and may individually store the grouped pixels in the memory.

In this case, the image processing apparatus 100 may load, into the internal memory, pixel values of a first pixel group corresponding to a predetermined search range, with reference to a target pixel region of an interpolation frame, and pixel values of a second pixel group of a range which is smaller than the predetermined search range.

When the pixel values of the first pixel group corresponding to the predetermined search range and the pixel values of the second pixel group of the range which is smaller than the predetermined search range are loaded into the internal memory, the image processing apparatus 100 may determine whether second pixel values of the second pixel group corresponding to the target pixel region are loaded into the internal memory in response to a motion size of the target pixel region being less than a predetermined threshold value.

In response to determining that the second pixel values of the second pixel group corresponding to the target pixel region being loaded into the internal memory, the image processing apparatus 100 may calculate pixel values of the target pixel region based on the first pixel values of the first pixel group corresponding to the target pixel region and the second pixel values of the second pixel group corresponding to the target pixel region, and may image-process the target pixel region with a higher resolution (S1420).

On the other hand, in response to determining that the second pixel values of the second pixel group corresponding to the target pixel region are not loaded into the internal memory, the image processing apparatus 100 may calculate second pixel values of the target pixel region based on the first pixel values of the first pixel group corresponding to the target pixel region, and may image-process the target pixel region with a lower resolution based on the first pixel values of the first pixel group corresponding to the target pixel region and the calculated second pixel values (S1430).

As described above, the image processing apparatus 100 may divide at least one of the first and second reference frames into a plurality of pixel blocks including a plurality of pixels, and may group pixel values of representative pixels in the plurality of pixel blocks. Thereafter, the image processing apparatus 100 may group difference values between the pixel value of the representative pixel and at least one other pixel, and may individually store the grouped difference values in the memory.

In this case, the image processing apparatus 100 may load, into the internal memory, pixel values of a first pixel group corresponding to a predetermined search range with reference to a target pixel region of an interpolation frame, and difference values between pixel values of pixels of the first pixel group and pixels of a second pixel group of a range which is smaller than the predetermined search range.

When the pixel values of the first pixel group corresponding to the predetermined search range and the difference values of the pixels of the second pixel group of the range which is smaller than the predetermined search range are loaded into the internal memory, the image processing apparatus 100 may determine whether second pixel values of the second pixel group corresponding to the target pixel region are loaded into the internal memory. As a result of determining, in response to the second pixel values of the second pixel group corresponding to the target pixel region being loaded into the internal memory, the image processing apparatus 100 may calculate a pixel value of at least one other pixel based on the difference value corresponding to at least one other pixel with reference to the representative pixel.

Thereafter, the image processing apparatus 100 may calculate pixel values of the target pixel region based on the pixel value of the representative pixel and the calculated pixel value of the at least one other pixel, and may image-process the target pixel region with a higher resolution.

The control method of the image processing apparatus 100 as described above may be implemented as at least one execution program that may be executed by a processor, and the execution program may be stored in a non-transitory computer readable medium.

The non-transitory readable medium refers to a medium that stores data semi-permanently, such as a register, a cache, and a memory, and is readable by an apparatus. Specifically, the above-described programs may be stored in various recording media readable at a terminal such as a RAM, a flash memory, a ROM, an erasable programmable ROM (EPROM), an electronically erasable and programmable ROM (EEPROM), a register, a hard disk, a removable disk, a memory card, a USB memory, a CD-ROM, or the like.

Exemplary embodiments have been shown and described, however, it will be understood by those skilled in the art that various changes in form and details may be made therein without departing from the spirit and scope of the present disclosure as described by the appended claims, and their equivalents.

What is claimed is:

1. An image processing apparatus comprising:
    an image input interface configured to receive an image content comprising a first reference frame and a second reference frame;
    a memory; and
    a processor configured to generate an interpolation frame based on the first reference frame and the second reference frame,
    wherein the processor is configured to:
        group a plurality of pixels included in at least one of the first reference frame and the second reference frame into a plurality of pixel groups,
        individually store each of the plurality of pixel groups in the memory,
        load, into an internal memory, pixel values corresponding to a predetermined range with reference to a target pixel region of the interpolation frame corresponding to a first pixel group from among the plurality of pixel groups,
        load, into the internal memory, pixel values of a range which is smaller than the predetermined range corresponding to a second pixel group of the plurality of pixel groups,
        based on a motion size of the target pixel region and a second pixel value corresponding to the target pixel being loaded into the internal memory, determine whether to use only a first pixel value corresponding to the first pixel group, or use both the first pixel value corresponding to the first pixel group and second pixel value corresponding to the second pixel group in determining pixel values of the target pixel region, and
        determine the pixel values of the target pixel region.

2. The image processing apparatus of claim 1, wherein the processor is further configured to divide at least one of the first reference frame and the second reference frame into a plurality of pixel blocks comprising a plurality of pixels, to group pixels of corresponding positions in each of the plurality of pixel blocks into the plurality of pixel groups, and to individually store each of the plurality of pixel groups in the memory.

3. The image processing apparatus of claim 1, wherein the processor is further configured to, in response to the motion size of the target pixel region being less than a predetermined value and the second pixel value corresponding to the target pixel region being loaded into the internal memory, determine the pixel values of the target pixel region based on the first pixel value and the second pixel value, and to image-process the target pixel region with a resolution above a predetermined resolution.

4. The image processing apparatus of claim 1, wherein the processor is further configured to, in response to the motion size of the target pixel region being greater than or equal to a predetermined value and the second pixel value corresponding to the target pixel region not being loaded into the internal memory, determine the second pixel value of the target pixel region based on the first pixel value, and to image-process the target pixel region with a resolution lower than a predetermined resolution.

5. The image processing apparatus of claim 4, wherein the processor is further configured to, in response to the motion size of the target pixel region being greater than or equal to the predetermined value and the second pixel value corresponding to the target pixel region not being loaded into the internal memory, determine the second pixel value of the target pixel region based on the first pixel value of a corresponding pixel block and a first pixel value of at least one adjacent pixel block.

6. The image processing apparatus of claim 4, wherein the processor is further configured to, in response to the motion size of the target pixel region being greater than or equal to the predetermined value and the second pixel value corresponding to the target pixel region not being loaded into the internal memory, determine the second pixel value of the target pixel region based on the first pixel value of a corresponding pixel block.

7. The image processing apparatus of claim 1, wherein the processor is further configured to divide at least one of the first reference frame and the second reference frame into a plurality of pixel blocks comprising a plurality of pixels, to group pixel values of representative pixels in each of the plurality of pixel blocks, to group a difference value between each of the representative pixels and at least one other pixel into a plurality of difference value groups, and to individually store each of the plurality of the difference value groups in the memory.

8. The image processing apparatus of claim 7, wherein the processor is further configured to, in response to the motion size of the target pixel region being less than a predetermined value and the difference value between the representative pixel corresponding to the target pixel region and at least one other pixel being loaded into the internal memory, determine a pixel value of the at least one other pixel based on the pixel value of the representative pixel and the difference value of the at least one other pixel, and to determine the pixel values of the target pixel region based on the pixel value of the representative pixel and the pixel value of the at least one other pixel determined, and to image-process the target pixel region with a resolution higher than a predetermined resolution.

9. The image processing apparatus of claim 1, wherein the processor is further configured to, in response to the motion size of the target pixel region being greater than or equal to a predetermined value and the second pixel value corresponding to the target pixel region not being loaded into the internal memory, set the second pixel value of the target pixel region to be equal to the first pixel value, and image-process the target pixel region with a resolution lower than a predetermined resolution.

10. A control method of an image processing apparatus, the control method comprising:
receiving an image content comprising a first reference frame and a second reference frame; and
generating an interpolation frame based on the first reference frame and the second reference frame,
wherein the generating the interpolation frame comprises:
grouping a plurality of pixels included in at least one of the first reference frame and the second reference frame into a plurality of pixel groups,
individually storing the plurality of pixel groups in a memory,
loading, into an internal memory, pixel values corresponding to a predetermined range with reference to a target pixel region of the interpolation frame with respect to a first pixel group from among the plurality of pixel groups,
loading, into the internal memory, pixel values of a range which is smaller than the predetermined range with respect to a second pixel group of the plurality of pixel groups,
based on a motion size of the target pixel region and a second pixel value corresponding to the target pixel being loaded into the internal memory, determine whether to use only a first pixel value corresponding to the first pixel group, or use both the first pixel value corresponding to the first pixel group and the second pixel value corresponding to the second pixel group in determining pixel values of the target pixel region,
determining the pixel values of the target region of the interpolation frame based on at least one of the first pixel group and the second pixel group loaded into the internal memory, and
image-processing the interpolation frame based on the determined pixel values.

11. The method of claim 10, wherein the storing comprises:

dividing at least one of the first reference frame and the second reference frame into a plurality of pixel blocks comprising a plurality of pixels;
grouping pixels of corresponding positions in each of the plurality of pixel blocks into the plurality of pixel groups; and
individually storing each of the plurality of pixel groups in the memory.

12. The method of claim 10, wherein the image-processing comprises:
in response to the motion size of the target pixel region being less than a predetermined value and the second pixel value corresponding to the target pixel region being loaded into the internal memory, determining the pixel values of the target pixel region based on the first pixel value and the second pixel value, and
image-processing the target pixel region with a resolution higher than a predetermined resolution.

13. The method of claim 10, wherein the image-processing comprises:
in response to the motion size of the target pixel region being greater than or equal to a predetermined value and the second pixel value corresponding to the target pixel region not being loaded into the internal memory, determining the second pixel value of the target pixel region based on the first pixel value, and
image-processing the target pixel region with a resolution lower than a predetermined resolution.

14. The method of claim 13, wherein the determining the second pixel value of the target pixel region comprises:
in response to the motion size of the target pixel region being greater than or equal to the predetermined value and the second pixel value corresponding to the target pixel region not being loaded into the internal memory, determining the second pixel value of the target pixel region based on the first pixel value of a corresponding pixel block and a first pixel value of at least one adjacent pixel block.

15. The method of claim 13, wherein the determining the second pixel value of the target pixel region comprises, in response to the motion size of the target pixel region being greater than or equal to the predetermined value and the second pixel value corresponding to the target pixel region not being loaded into the internal memory, determining the second pixel value of the target pixel region based on the first pixel value of a corresponding pixel block.

16. The method of claim 10, wherein the storing comprises:
dividing at least one of the first reference frame and the second reference frame into a plurality of pixel blocks comprising a plurality of pixels;
grouping pixel values of representative pixels in the plurality of pixel blocks;
grouping a difference value between the representative pixel and at least one other pixel in each of the plurality of pixel blocks into a plurality of difference value groups, and individually storing each of the plurality of difference value groups in the memory.

17. The method of claim 16, wherein the determining comprises:
in response to the motion size of the target pixel region being less than a predetermined value and the difference value between the representative pixel corresponding to the target pixel region and at least one other pixel being loaded into the internal memory, determining a pixel value of the at least one other pixel based on the pixel value of the representative pixel and the difference value corresponding to the at least one other pixel, and wherein the image-processing comprises determining the pixel values of the target pixel region based on the pixel value of the representative pixel and the determined pixel value of the at least one other pixel, and image-processing the target pixel region with a resolution higher than a predetermined resolution.

18. The method of claim 10, wherein the determining pixel values of the target region comprises:

in response to the motion size of the target pixel region being greater than or equal to a predetermined value and the second pixel value corresponding to the target pixel region not being loaded into the internal memory, setting the second pixel value of the target pixel region to be equal to the first pixel value, and image-processing the target pixel region with a resolution lower than a predetermined resolution.

* * * * *